United States Patent [19]

Bogdanowicz et al.

[11] Patent Number: 5,555,085
[45] Date of Patent: Sep. 10, 1996

[54] SYSTEM AND METHOD FOR SCENE LIGHT SOURCE ANALYSIS

[75] Inventors: Mitchell J. Bogdanowicz, Spencerport; Richard C. Sehlin, Rochester, both of N.Y.; Rami Mina, Thousand Oaks, Calif.

[73] Assignee: Eastman Kodak Company, Rochester, N.Y.

[21] Appl. No.: 391,874

[22] Filed: Feb. 22, 1995

[51] Int. Cl.⁶ .................................. G01J 3/00; G01J 3/50
[52] U.S. Cl. ........................... 356/300; 356/404; 354/430
[58] Field of Search ..................................... 356/300, 326, 356/328, 404, 225, 229; 354/430

[56] References Cited

U.S. PATENT DOCUMENTS

| | | | |
|---|---|---|---|
| 4,511,229 | 4/1985 | Schwartz et al. | 354/430 |
| 4,568,286 | 4/1987 | Schwartz et al. | 348/179 |
| 5,172,146 | 12/1992 | Woolridge | 354/430 |

*Primary Examiner*—F. L. Evans
*Attorney, Agent, or Firm*—Francis H. Boos, Jr.

[57] ABSTRACT

System and method for rapid measurement of an exposure light source and calculation of filter selection for proper color balanced exposure of a light sensitive medium includes measurement of the light source with a spectroradiometer and calculation of color log exposure differences for successive filters taken from a database list with the filter selection being based on a minimum overall difference value derived from the summation of the absolute values of the individual color log exposure differences.

9 Claims, 7 Drawing Sheets

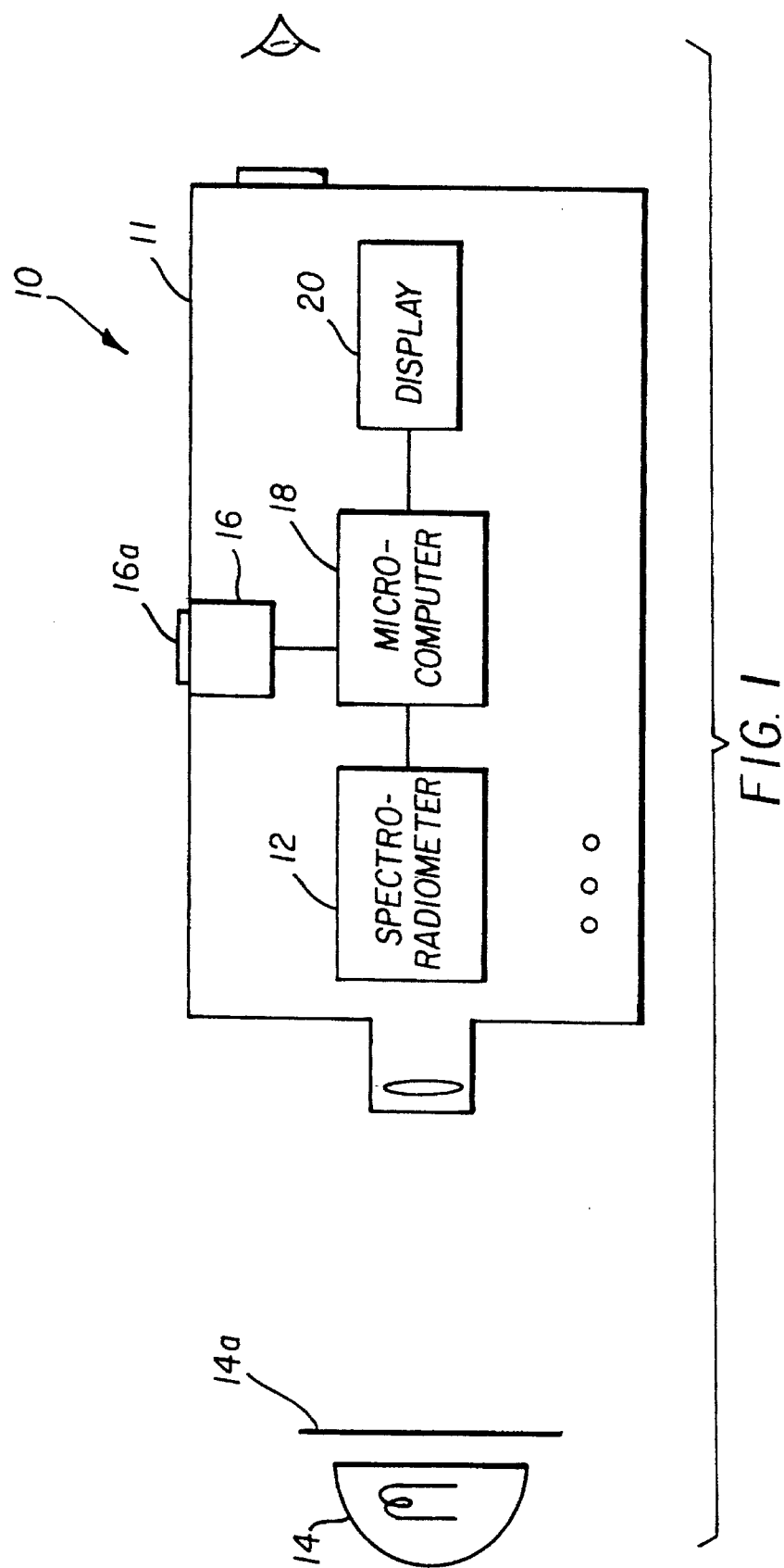
FIG. I

SYSTEM AND METHOD FOR SCENE LIGHT SOURCE ANALYSIS

FIELD OF INVENTION

This invention relates to the analysis of scene lighting used to expose an image capture system where the image capture system may use silver halide based or solid state based light sensitive mediums. This system assists in selection of light modifying filters to attain the proper color balance criterion.

BACKGROUND OF THE INVENTION

Most photographic materials are manufactured such that the exposure balance between red, green and blue layers is attained when the intended light source is used. The intended light source in this case corresponds to the reference illuminant for which the photographic material's spectral response characteristics are determined. The two primary reference light sources are Daylight (5500 Kelvin) and Tungsten (3200 Kelvin). The tone scale and quality of the reproduction will depend upon the exposure level and color balance. In actual practice, the intended light source is seldom available and some variation is usually apparent. Further, the classic intended light sources have continuous spectra. Many of the light sources encountered today have significant line spectra included in the overall light spectra. Examples of this are fluorescent lamps and certain metal vapor lamps. It is difficult for the photographer to assess the nature of the light. A typical instrument used to determine the relative amount of red, green and blue light present is the Color Temperature Meter. This meter usually has three sensors, red, green and blue. The color temperature in Kelvin is recorded for the light source tested. The color temperature is then related through an empirical relationship to the spectral sensitivity of the photographic material. A difficulty with meters of this type is that they do not have any data for specific photographic materials, including the spectral sensitivity and the sensitometric curve (which determines the tonal relationship of the reproduction).

Manufacturers of filters for lenses and colored materials to filter light sources have tolerances around the performance of their products. A photographer usually has to accept the published parameters of the filter in the use of the product. The filters also can degrade over time or with storage conditions (adverse heat or light degradation). Thus, the exact nature of the filter product is not known.

The combination of light source variation and filtration variation can result in inconsistent exposure and consequent reproduction quality.

Photographic media have a wide variety of sensitometric response curves. No currently available light measuring system can easily relate the scene light source and areas of different light intensities with the sensitometric curve shape of the actual photographic material. Additionally, the effect of the spectral transmittance characteristic of the camera taking lens on color balance in the resultant exposure is also not addressed by the color temperature meters currently employed.

The problem to be addressed herein is the accurate electronic emulation of the photographic system such that the performance of the photographic material can be easily assessed with regard to light source, filters, lenses and product to product sensitometric differences.

SUMMARY OF THE INVENTION

In accordance with one aspect of the invention, therefore, there is provided a system for analysis of a photographic light source to which a light sensitive medium is to be exposed which comprises spectral measurement means for measuring spectral intensities of the photographic light source at predetermined increments of wavelength in each of a plurality of colors. The system also includes data storage means for providing reference spectral data, at corresponding increments of wavelength for each of said plurality of colors, said reference spectral data being representative of (i) spectral transmittances of a plurality of known filter types, (ii) spectral sensitivities of said light sensitive medium, and (iii) spectral intensities of a reference illuminant on which said light sensitive medium spectral sensitivities are based. The system further includes a microcomputer; and an output display device, wherein the microcomputer is programmed to respond to the reference spectral data and to the measured light source spectral intensities in each of the colors for determining first log exposures of the light sensitive medium to the light source and second log exposures of the light sensitive medium to the reference illuminant. The microcomputer program determines differences between the first and second log exposures and an error value which is comprised of a summation of the absolute values of the differences. The microcomputer is further programmed to be responsive to the error value to make a filter selection from the known filter types that provides a desired approximation of spectral response of the light sensitive material to the light source relative to the spectral response of the material to the reference illuminant. Finally, the microcomputer provides information as to the filter selection to the output display device for presentation to a user of the system.

BRIEF DESCRIPTION OF THE DRAWINGS

In the drawings:

FIG. 1 is a schematic illustration, partially in block diagram form, of a system for light source analysis in accordance with the invention;

DETAILED DESCRIPTION OF THE INVENTION

Figure 2A:
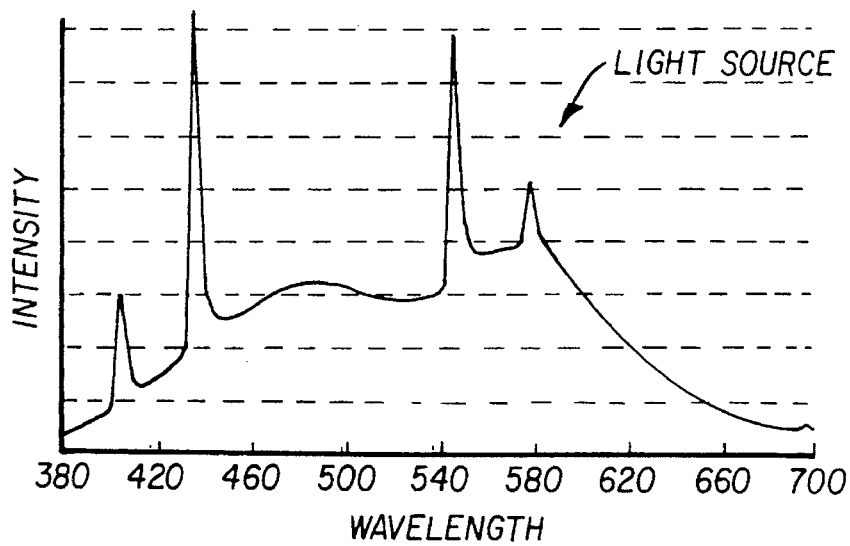
FIGS. 2A–2C illustrate the derivation of spectral response curves from a representative light source and light sensitive medium which is useful in explaining the concept of the present invention.

Referring now to FIG. 1, a system 10 is shown for analysis of a photographic light source to which a light sensitive medium is to be exposed. The analysis system is preferably in the form of a portable, hand held device enclosed in a housing 11. The system 10 includes spectral measurement means, such as spectroradiometer 12 of known design, for measuring spectral intensities of a photographic light source 14 at predetermined increments of wavelength in each of a plurality of colors, such as red, green and blue. The light source 14 may include a filter 14a. The system also includes data storage means for providing reference spectral data, at corresponding increments of wavelength for each of the plurality of colors, red, green and blue. The storage means may comprise programmable memory means incorporated in the housing 10, or, more preferably, may comprise a storage data input device 16 adapted to receive and read data from a PCMCIA, or similar, data storage card 16a. The reference spectral data recorded on the PCMCIA card is representative of (i) spectral sensitivities of light sensitive medium, (ii) spectral intensities of a reference illuminant on which the light sensitive medium spectral sensitivities are based, and (iii) spectral transmittances of a plurality of known color filter types which are used to spectrally modify the spectral intensities of the light source when the light medium is being exposed to achieve improved color balance in the exposed medium. Typically, the light medium is photographic film, such as motion picture or still image film although it will be appreciated ensuing description that the invention has equal utility when analyzing light sources for use in exposing solid state image sensors such as in digital or analog video cameras.

The system 10 further is provided with a microcomputer 18 an output display device 20 for communicating information regarding the analytic results to the user of the system. The display may comprise an LCD type of display. The microcomputer 18 is programmed to respond to the reference spectral data from storage means 16 and to the measured light source spectral intensities from spectroradiometer 12 in each of the colors red, green and blue to determine first log exposures of the light sensitive medium to said light source 14 and second log exposures of the light sensitive medium to the reference illuminant. The program further determines differences between the first and second log exposures and an error value comprised of a summation of the absolute values of these differences. The microcomputer is then programmed to be responsive to the determined error value to make a selection from the known filter types represented by the data in storage device 16 that provides a desired approximation of spectral response of the light sensitive material to the light source 14 relative to the spectral response of the material to the reference illuminant. Information representing this filter selection is then outputted to said output display device for presentation to the user of the system.

Figure 2B:
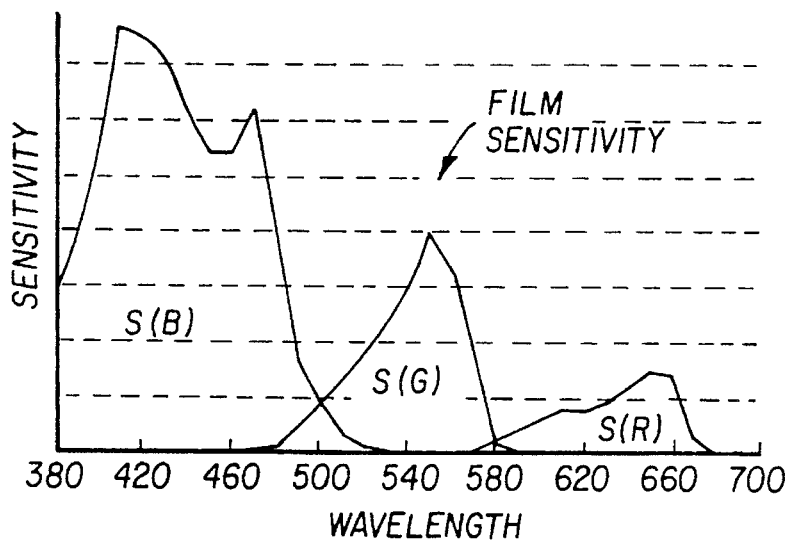
Figure 2C:
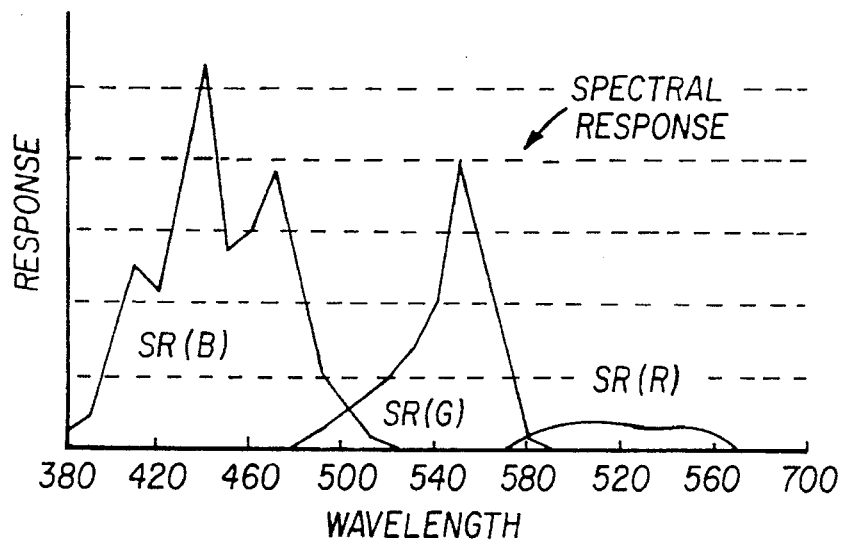

Referring to FIG. 2, there will now be considered in more detail the operation of the system 10. The light source 14 is measured with spectroradiometer 12 wavelength by wavelength at a desired resolution, preferably in a range of from 1 nm to 40 nm to produce spectral intensity data shown in graph A The spectral sensitivities of the photographic material which is to be exposed to the light source is illustrated in graph B as S(R), S(G) and S(B). The spectral sensitivities are well known in the art as the spectral responses of the material to an equal energy illuminant (an equal energy illuminant being one with the same energy at all wavelengths). The spectral response curves are derived from the light source and the spectral sensitivities by multiplying the light intensity L with each of the spectral sensitivity curves, wavelength by wavelength. The result is illustrated in FIG. 2C as SR(R), SR(G) and SR(B). The exposure E to the photographic material is then calculated in microcomputer 18 as follows:

$$\text{Red Exposure: } E(R) = \int_{300}^{700} L*S(R)d\lambda \quad (1)$$

$$\text{Green Exposure: } E(G) = \int_{300}^{700} L*S(G)d\lambda \quad (2)$$

$$\text{Blue Exposure: } E(B) = \int_{300}^{700} L*S(B)d\lambda \quad (3)$$

Thus, the exposures of each color record is the integral of the product at incremental wavelengths of the light source spectral intensities and the spectral sensitivity of the corresponding photographic material record. These exposure are transformed into Log exposures by:

$$R=-\text{Log}(E(R)) \quad (4)$$

$$G=-\text{Log}(E(G)) \quad (5)$$

$$B=-\text{Log}(E(B)) \quad (6)$$

Thus R, G and B are the log exposures of the light source to the photographic material. These exposures reflect the color balance and intensity information as recorded on the photographic material. The values of these exposures can be outputted by the microcomputer to the display 20 for indication to the user of the light intensity level (as detected by the photographic material) as described below. These values may then be compared to the log exposures for the photographic material with the intended (reference) illuminant, i.e. the illuminant (e.g. daylight or tungsten) for which the light sensitive medium sensitivities are characterized, to obtain difference values $\Delta R$, $\Delta G$ and $\Delta B$, These difference values are the differences for each measured color between the light source being analyzed and the reference illuminant as shown by the expressions:

$$\Delta R=R-R_{ref} \quad (7)$$

$$\Delta G=G-G_{ref} \quad (8)$$

$$\Delta B=B-B_{ref} \quad (9)$$

If the resulting differences are all 0.0, then the light source being measured will perform similarly to the reference illuminant for the light sensitive medium being considered.

Figure 3:
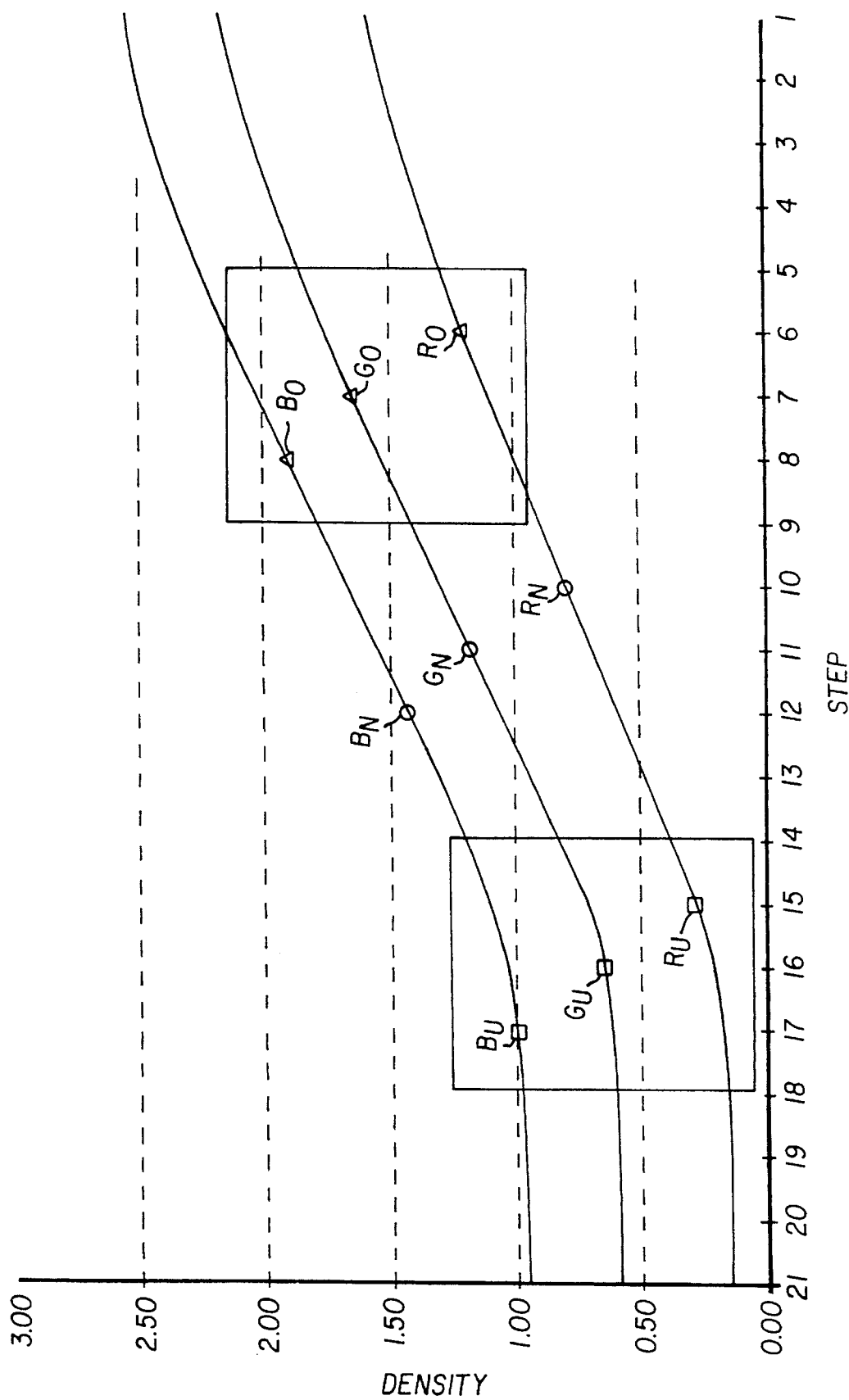
FIG. 3 illustrates a D/LogE curve displayed by the system of FIG. 1.
Figure 4A:
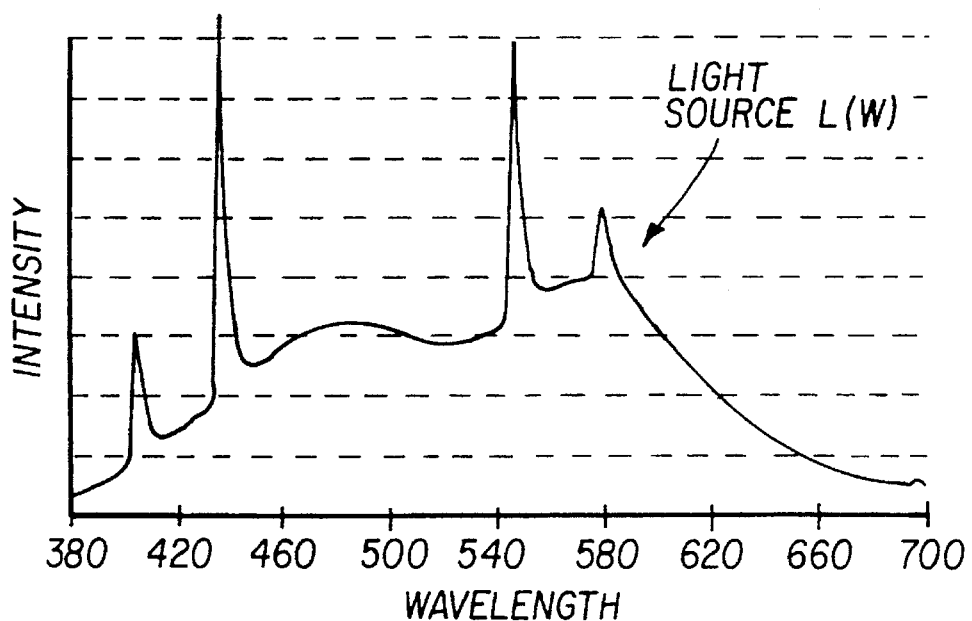
FIGS. 4A–4D illustrate a series of spectral curves used in describing a feature of the invention.
Figure 4B:
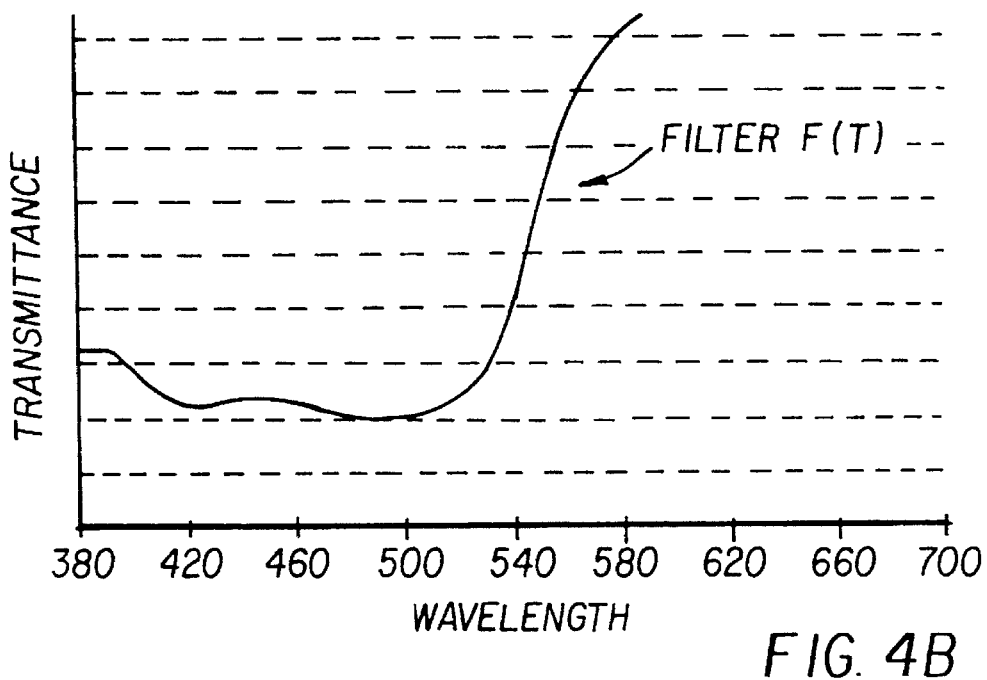
Figure 4C:
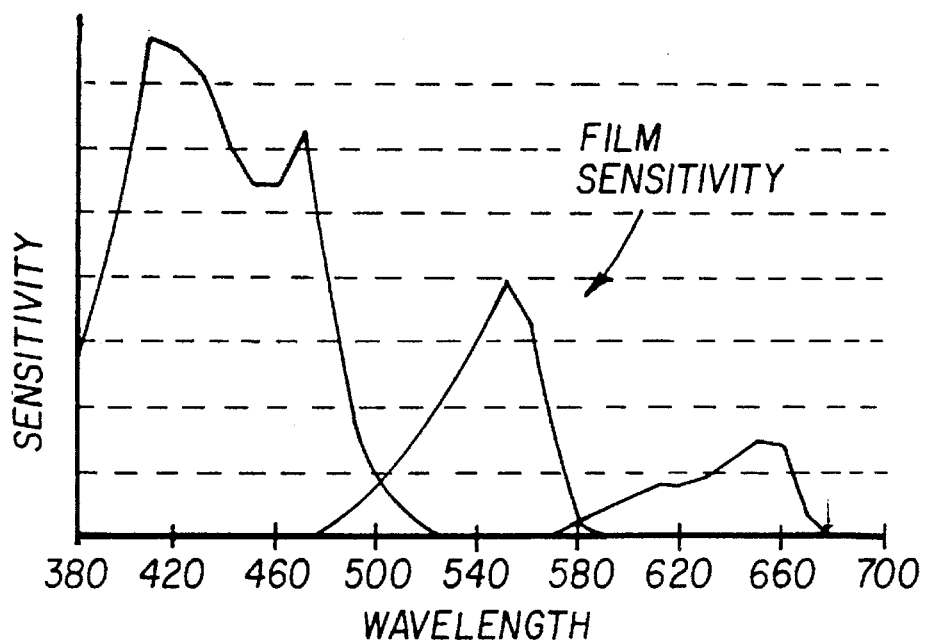
Figure 4D:
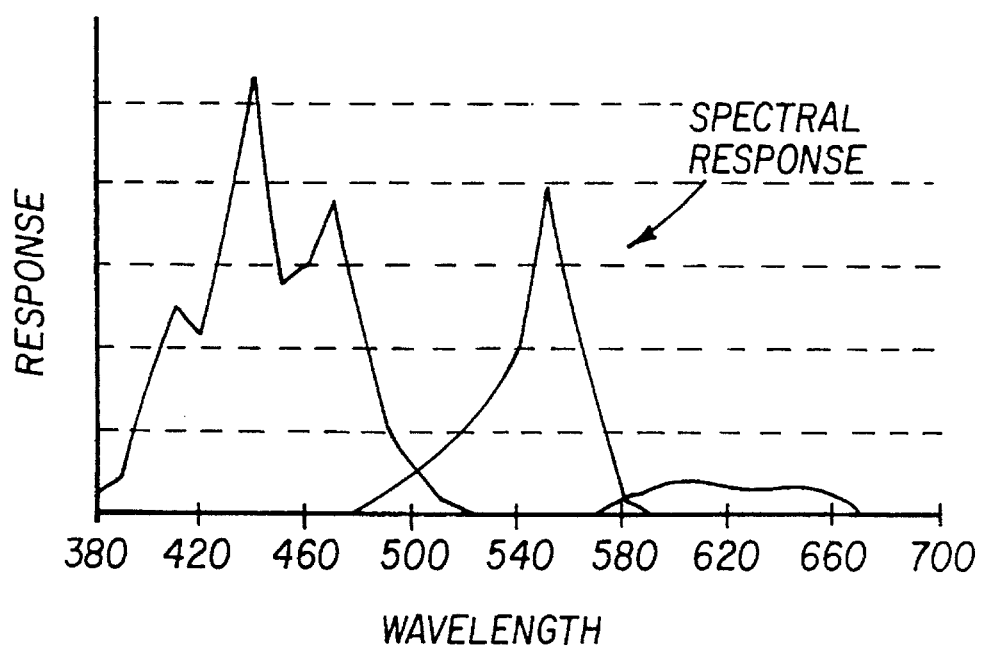

In accordance with one feature of the invention, the R, G and B values can be displayed by display 20 as points on a photographic material sensitometric curve as illustrated in FIG. 3. The normal mid-gray reproduction is shown at points $B_N$, $G_N$, $R_N$ along with two other readings of a lighter area $B_O$, $G_O$, $R_O$ and a darker area $B_U$, $G_U$, $R_U$. This display enables the photographer user of the analyzer system to assess where on the sensitometric curve various areas in the scene will be recorded.

In accordance with another feature of the invention, the effect of a specific filter or combination of filters may be directly determined. The same set of calculations, as described above, is performed on the measurement of the light source 14 and filter 14a (or filter combination) in accordance with the following expressions for exposure values:

$$\text{Red Exposure: } E(R) = \int_{300}^{700} L*F(T)*S(R)d\lambda \qquad (10)$$

$$\text{Green Exposure: } E(G) = \int_{300}^{700} L*F(T)*S(G)d\lambda \qquad (11)$$

$$\text{Blue Exposure: } E(B) = \int_{300}^{700} L*F(T)*S(B)d\lambda \qquad (12)$$

When converted to log exposure values according to expressions (4)–(6), the resultant R, G and B values will then indicate the effect of the filter(s) on the system.

In a particularly preferred embodiment of this invention, the system is designed to predict the performance of an optimum filter—light—photographic material in a rapid and accurate manner and, in this way, allow the photographer to select a desired set of filters for use in matching the light source to the photographic material. In this mode, a light source used for exposure needs to be corrected spectrally in order to achieve the proper color balance. The correction is done with filter, either over the lens or over the light source. For this purpose, a database of filter transmittance data is inputted from the data storage device, e.g. device 16 and is used to achieve the desired balance.

The method for achieving this is illustrated in FIG. 4. Data obtained from measurement of an initial light source L(W), shown in graph 4A, is multiplied in microcomputer 18, wavelength by wavelength, by the spectral transmittance data for a first test filter F(T) in the database, shown in graph 4B, as well as by the spectral sensitivities (S(R), S(G) and S(B)) of the photographic material which are shown in graph 4C. The resulting spectral responses, shown in graph 4D, are integrated in microcomputer 18 according to the expressions (10)–(12) to determine the log exposures R, G, B and the log exposure differences ΔR, ΔG, ΔB from the reference light source, as described above. An overall color exposure error ΔE is then calculated as follows:

$$\Delta E = abs(R-R_{ref}) + abs(G-G_{ref}) + abs(B-B_{ref}) \qquad (13)$$

This ΔE value is retained to compare to subsequent filter determinations. The next filter in the database is used as F(T) in the integral calculations (10)–(12) and the corresponding ΔE is determined. The lower ΔE value as between the two filters and the name of the respective filter is then retained in memory. This process is repeated until the list of filters in the database is exhausted. The filter which is associated with the lowest value of ΔE is then reported and displayed on display 20 as the filter selection providing the best filter out of the database list to balance the light source—photographic material combination. While this provides the photographer with a rapid indication of which filter provides the best color balance for the measured light source, it may be that the ΔE value obtained is not 0.0. This means, of course, that the color balance is not complete and further filtration may be required. In this case, the spectral transmittance characteristic of the best filter just identified is multiplied by the spectral intensity of the light source L(W), wavelength by wavelength, and the product is used as a virtual working light source for determination of a further filter selection. In effect, this applies the first determined best filter to the light source and the process represented by expressions (10)–(13) is repeated with the whole filter database list for the virtual light source to arrive at a second determined best filter selection. The second determined best filter is reported via display 20 to be used in combination with the first best filter and the ΔE value from this stage is the culmination of using both filters. This process may be repeated as many times as desired until an acceptable balance is achieved.

Figure 6:
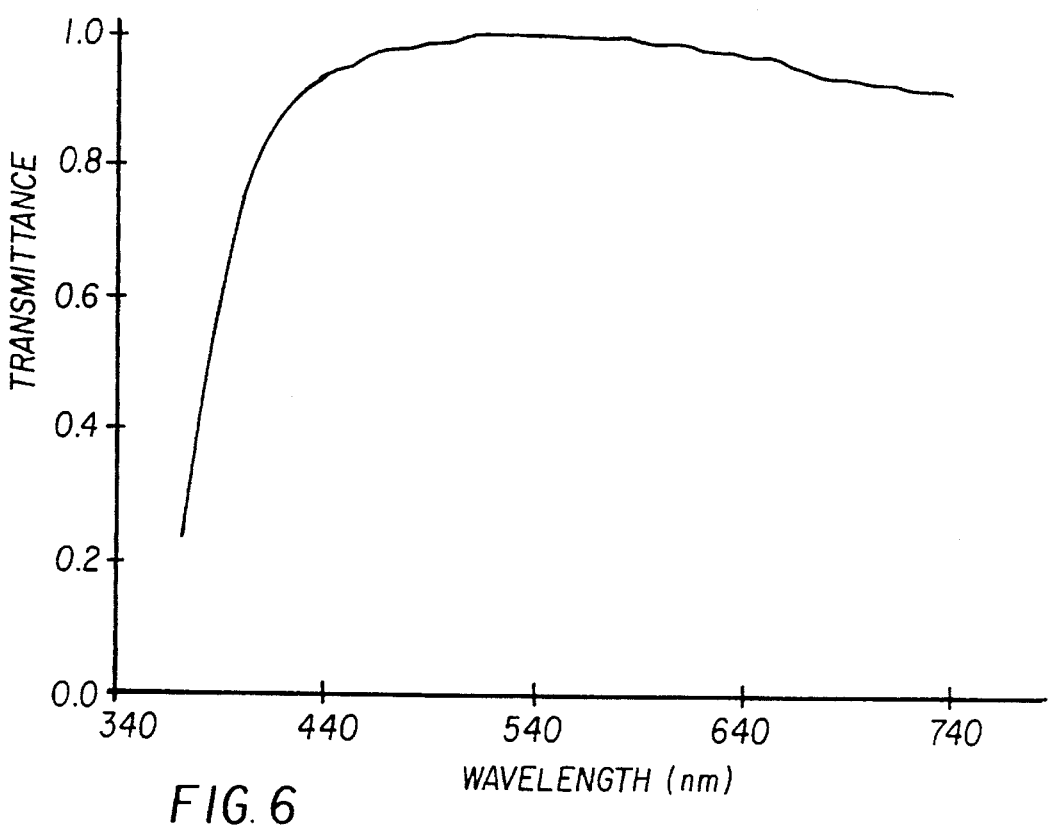
FIG. 6 is a spectral transmittance curve of a standard lens.
Figure 7:
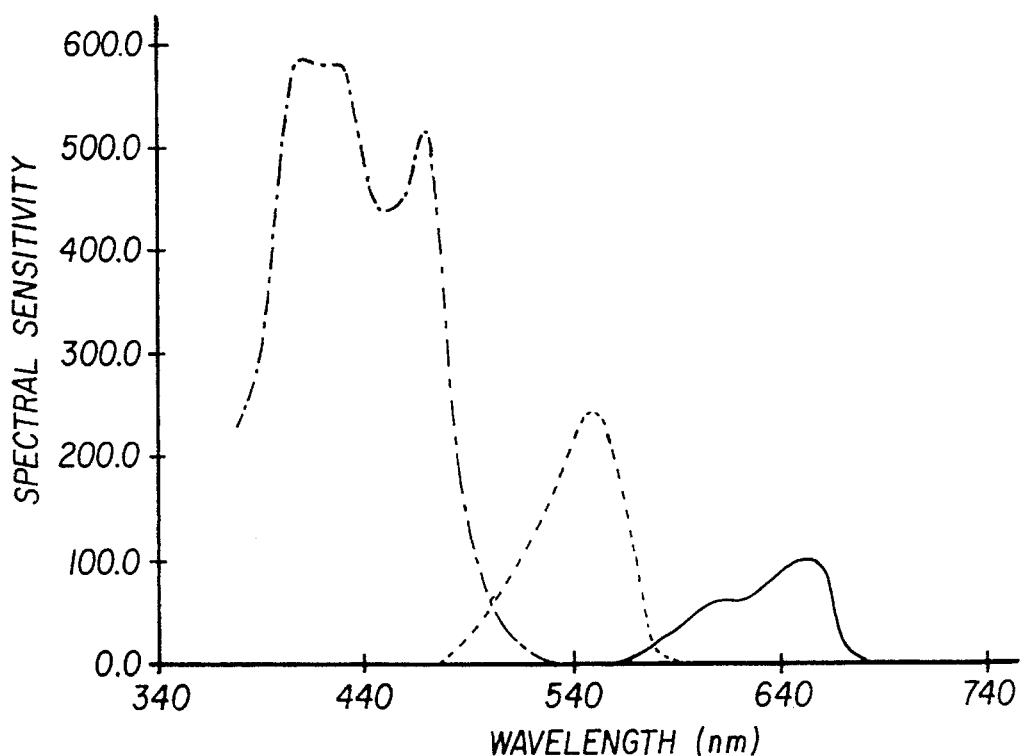
FIG. 7 shows spectral sensitivity curves for a representative motion picture film.

The invention allows the inclusion of a lens spectral transmittance such as is shown in FIG. 6, as well as the spectral sensitivity of a specific film in determining an optimum filter selection. The advantage of including the lens characteristic is that its effect can be taken into account in measuring the effect of the light source on color balance, which is not the case with color temperature meters which directly measure the light source and have no provision for effects of lens transmittance. When the effect of lens transmittance is included as an additional factor in the integral expressions (10)–(12) during the filter selection calculations, it is used only once, preferably at the time that the first filter selection is made.

As previously mentioned, the R, G and B values corresponding to the light source and all the filters can be displayed on display 20 as points on the photographic material sensitometric curve as illustrated in FIG. 3. The results can be presented as log exposure changes, changes in Stops (1 Stop=0.30 log exposure) or, in the motion picture art, as T-Stops or in Printer Points (A printer point is the usual unit of exposure control on a motion picture printer. Many cinematographers use the printer balance values as an indication of exposure performance. A red printer point change is calculated by the formula P(R)=(DR*γ)/0.025, where y is the known gamma (contrast) of the photographic material. The green P(G) and blue P(B) printer point changes are calculated similarly.

As an example of the utility of the invention, there will now be described a situation which can arise in normal practice.

Figure 5:
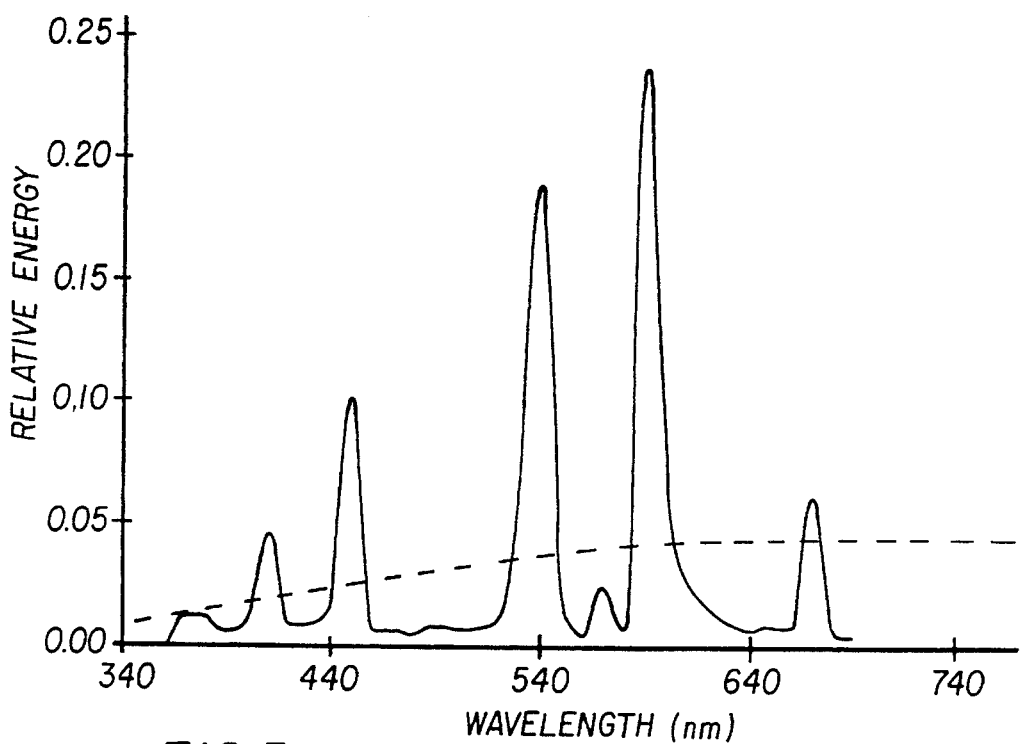
FIG. 5 illustrates the different spectral curves for a representative light source and a black body having the same color temperature as the light source.

The Olympic Stadium in Munich, Germany has metal vapor lamps for illumination. FIG. 5 presents a plot of the spectral energy (intensity) of the light source. Notice that the energy is concentrated into bands which correspond to the emission characteristics of the metal vapors used in manufacturing. Currently, a photographer can measure the color temperature of this light and then correlate the color temperature to a filter correction for a general film type. The measured color temperature of the Olympic Stadium light is 4100 Kelvin. The color temperature measurement is designed to find the closest blackbody radiator which will appear to be a visual match with the light source under test. The important point here is that the color temperature is correlated to a visual appearance rather than a film spectral response. A blackbody radiator with a color temperature of 4100 Kelvin is shown in dotted line in FIG. 5 as compared to the Olympic Stadium Light as shown in solid line. Both of these lights have a 4100 Kelvin color temperature.

Figure 8:
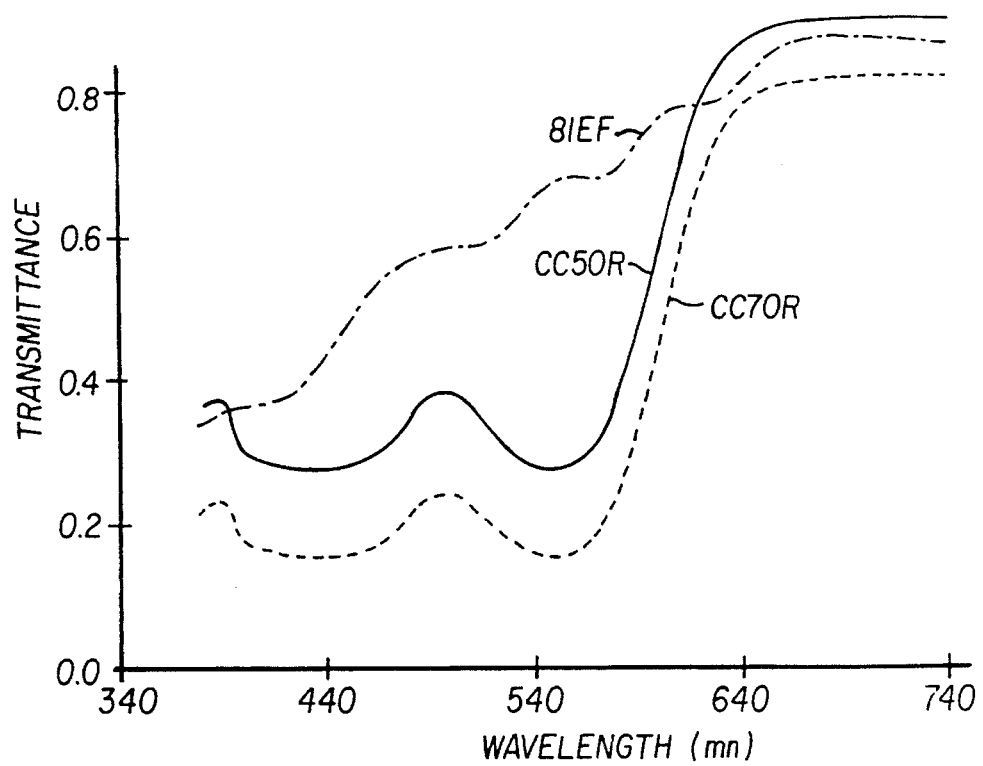
FIG. 8 is a graph comparing spectral transmittance curves for different filters which is used in explaining the concept of the invention.

The recommendation for the Olympic Stadium based on a conventional color temperature meter is to use an 81EF filter having a spectral transmittance characteristic shown by the dash-dot line in FIG. 8.

Analysis of the Olympic Stadium light with the method of this invention, however, gives a different answer. In this example, using a lens with a transmittance characteristic as shown in FIG. 6 and Eastman Kodak 5287 film having a spectral sensitivity characteristic as shown in FIG. 8 are used. When the exposure to the film is determined using the ΔE calculations for the database list of filters as described previously, the first filter recommended is a CC50R (Color Correcting 50 Red), shown in solid line in FIG. 8). The log exposures of the filter—light—lens and film combination are:

log exposure - Red: −0.54      (11)

log exposure - Green: −0.40                              (12)

log exposure - Blue : −0.42                              (13)

It can be seen that the proper balance is not achieved with one filter since the three exposures are not equal which will cause a color bias. Repeating the ΔE analysis as described above with the first filter characteristic included in the virtual light source indicates an additional CC20R should be added to the CC50R to improve the color balance. The combination is a CC70R filter as shown in dotted line in FIG. 8. The log exposures of the filter—light—lens and film combination now are:

log exposure (Red): −0.65 log exposure (Green): −0.65 log exposure (Blue): −0.65

This final condition is a balanced position since the log exposures are equivalent. Also, from these numbers it is evident that the filter factor (the amount of additional overall exposure required to overcome the attenuation afforded by the filter) is +0.65 or approximately 2 stops of additional exposure (1 stop=0.30 log exposure).

If the 81EF filter was used with this light source and film system, the log exposures of the filter - light - lens and film combination are:

log exposure (Red): −0.36 log exposure (Green): −0.02 log exposure (Blue): −0.20 From these values it can be seen that the results of using the 81EF filter in this system would be a Red record that is under exposed by over 1 stop and a Blue record which is under exposed by about ⅔ stop. In a system using transparency film, this would produce an image with a large decrease in cyan dye and a decrease in yellow dye, it would look very red-magenta and probably be unacceptable. The CC70R filtration would be acceptable.

The invention has been described with reference to a preferred embodiment. However, it will be appreciated that variations and modifications can be effected by a person of ordinary skill in the art without departing from the scope of the invention.

PARTS LIST

10—light source analysis system

11—housing

12—spectroradiometer

14—photographic light source

16—PCMCIA storage device

18—microcomputer

20—output display

What is claimed is:

1. A system for analysis of a scene light source to which a light sensitive medium is to be exposed comprising:

a) spectral measurement means for measuring spectral intensities of said light source at predetermined increments of wavelength in each of a plurality of colors;

b) data storage means for providing reference spectral data at corresponding increments of wavelength for each of said plurality of colors, said reference spectral data being representative of (i) spectral transmittances of a plurality of known filter types, (ii) spectral sensitivities of said light sensitive medium, and (iii) spectral intensities of a reference illuminant on which said light sensitive medium spectral sensitivities are based;

c) a microcomputer; and d) an output display device;

e) the microcomputer being programmed to respond to said reference spectral data and to said measured light source spectral intensities in each of said colors for determining (i) first log exposures of said light sensitive medium to said light source (ii) second log exposures of said light sensitive medium to said reference illuminant (iii) differences between said first and second log exposures and (iv) an error value comprised of a summation of the absolute values of said differences, said microcomputer being further programmed to be responsive to said error value (v) to make a selection from said known filter types that provides a desired approximation of spectral response of the light sensitive material to the light source relative to the spectral response of the material to the reference illuminant, and (vi) for providing said selection to said output display device for presentation to a user of said system.

2. A system according to claim 1 wherein said display device is adapted to respond to said microcomputer to display sensitometric curves for the light sensitive medium and to display said first log exposures on the sensitometric curve display.

3. A method of analyzing a light source for exposure to a light sensitive medium, comprising the steps of:

providing spectral sensitivity data for a known light sensitive medium;

providing spectral intensity data for a reference illuminant intended for the light sensitive medium;

measuring spectral intensity of said light source at predetermined increments of wavelength;

determining log exposures for the measured light source for each of a plurality of colors as a function of the integral of the product, at incremental wavelengths, of measured light source spectral intensities and spectral sensitivities of said known light sensitive medium;

determining log exposures for the reference illuminant for each of said plurality of colors as a function of the integral of the product, at said incremental wavelengths, of reference illuminant spectral intensities and spectral sensitivities of said known light sensitive medium;

determining, for each of said colors, log exposure difference values between the log exposures of the measured light source and the reference illuminant; and displaying said determined difference values on a sensitometric curve display for said known light sensitive medium.

4. The method of claim 3 further comprising:

providing filter spectral transmittance data for at least one known filter type;

including filter spectral transmittance data for at least one filter type in the determination of log exposure value for the light source.

5. The method of claim 3 further comprising:

providing a database of filter spectral transmittance data for a plurality of known filter types;

determining said log exposures for the measured light source for each of said plurality of filter types;

determining an exposure error value for each of said filter types as a function of the summation of the absolute values of said log exposure difference values; and making a filter selection based on a filter type that produces a minimum exposure error value.

6. The method of claim 5 wherein after an initial filter selection is made, the steps of determining exposure error value are repeated with filter transmittance data from said an initial filter selection included to determine a second exposure error value; and a further filter selection is made based on said second exposure error value.

7. The method of claim 3 wherein camera lens spectral transmittance data is included in the determination of log exposure value for the light source.

8. The method of claim 3 wherein said light sensitive medium is a silver halide based material.

9. The method of claim 3 wherein said light sensitive medium is a solid state sensor.

* * * * *